United States Patent
Park et al.

(10) Patent No.: US 12,454,732 B2
(45) Date of Patent: *Oct. 28, 2025

(54) NON-DIRECTIONAL ELECTRICAL STEEL SHEET AND METHOD FOR PRODUCING SAME

(71) Applicant: POSCO, Pohang-si (KR)

(72) Inventors: June Soo Park, Pohang-si (KR); Jaewan Hong, Pohang-si (KR); Dae-Hyun Song, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 1020 days.

This patent is subject to a terminal disclaimer.

(21) Appl. No.: 17/298,209

(22) PCT Filed: Nov. 27, 2019

(86) PCT No.: PCT/KR2019/016490
§ 371 (c)(1),
(2) Date: May 28, 2021

(87) PCT Pub. No.: WO2020/111781
PCT Pub. Date: Jun. 4, 2020

(65) Prior Publication Data
US 2022/0127690 A1    Apr. 28, 2022

(30) Foreign Application Priority Data

Nov. 30, 2018    (KR) .................. 10-2018-0152985

(51) Int. Cl.
| | | |
|---|---|---|
| *C21D 9/46* | (2006.01) | |
| *C21D 6/00* | (2006.01) | |
| *C21D 8/00* | (2006.01) | |
| *C21D 8/12* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/14* | (2006.01) | |
| *H01F 1/147* | (2006.01) | |

(52) U.S. Cl.
CPC .............. *C21D 9/46* (2013.01); *C21D 6/005* (2013.01); *C21D 6/008* (2013.01); *C21D 8/005* (2013.01); *C21D 8/1222* (2013.01); *C21D 8/1233* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *H01F 1/147* (2013.01); *C22C 2202/02* (2013.01)

(58) Field of Classification Search
CPC ...................................................... C21D 9/46
See application file for complete search history.

(56) References Cited

U.S. PATENT DOCUMENTS

| | | |
|---|---|---|
| 2012/0014828 A1 | 1/2012 | Miyazaki et al. |
| 2015/0348686 A1 | 12/2015 | Toda et al. |
| 2016/0076125 A1 | 3/2016 | Koseki et al. |
| 2017/0241002 A1* | 8/2017 | Nakajima ............... C22C 38/00 |
| 2018/0230564 A1 | 8/2018 | Nakajima et al. |
| 2022/0049322 A1* | 2/2022 | Hong .................... C22C 38/004 |
| 2023/0021153 A1* | 1/2023 | Lee ......................... C22C 38/34 |

FOREIGN PATENT DOCUMENTS

| | | |
|---|---|---|
| CN | 105008568 A | 10/2015 |
| JP | 2001-098329 A | 4/2001 |
| JP | 2003-166019 A | 6/2003 |
| JP | 2007-031793 A | 2/2007 |
| JP | 2008-050686 A | 3/2008 |
| JP | 2011-162872 A | 8/2011 |
| JP | 2011-190485 A | 9/2011 |
| JP | 2014-185365 A | 10/2014 |
| JP | 2018-504516 A | 2/2018 |
| JP | 6341281 B2 | 6/2018 |
| JP | 6390876 B2 | 9/2018 |
| KR | 10-2001-0100866 A | 11/2001 |
| KR | 10-2008-0027913 A | 3/2008 |
| KR | 10-1700694 B1 | 1/2017 |
| KR | 10-2018-0070949 A | 6/2018 |
| KR | 10-1898368 B1 | 9/2018 |
| KR | 10-1902438 B1 | 9/2018 |
| KR | 10-1904309 B1 | 10/2018 |
| WO | 2010/140509 A1 | 12/2010 |
| WO | 2016/002904 A1 | 1/2016 |

(Continued)

OTHER PUBLICATIONS

Chinese Office Action dated Apr. 25, 2022 issued in Chinese Patent Application No. 201980078977.6.
Japanese Office Action dated Feb. 21, 2023 issued in Japanese Patent Application No. 2021-531046.
Extended European Search Report dated Jul. 30, 2021 issued in European Patent Application No. 19890468.2.
International Search Report and Written Opinion issued in corresponding International Application No. PCT/KR2019/016490 dated Jun. 26, 2020, with English translation.

*Primary Examiner* — Jophy S. Koshy
(74) *Attorney, Agent, or Firm* — Morgan Lewis & Bockius LLP (57) ABSTRACT

A non-oriented electrical steel sheet according to one embodiment of the present invention comprises: 1.5 to 4.0 wt % of Si; 0.1 to 1.5 wt % of Mn, 0.7 to 1.5 wt % of Al; 0.0001-0.003 wt % of Bi; and 0.0001 to 0.003 wt % of Ga, with the balance comprising Fe and inevitable impurities, and satisfies the following Formula 1.

$$[Al]+[Mn] \geq 0.87 \qquad \text{[Formula 1]}$$

(here, [Al] and [Mn] represent the contents (wt %) of Al and Mn, respectively.)

8 Claims, 2 Drawing Sheets

(56) References Cited

FOREIGN PATENT DOCUMENTS

| WO | WO-2016027565 A1 * | 2/2016 | ........... C21D 8/1266 |
|----|----|----|----|
| WO | 2017/022360 A1 | 2/2017 | |
| WO | 2018/117598 A1 | 6/2018 | |
| WO | 2018/117600 A1 | 6/2018 | |
| WO | 2018/117602 A1 | 6/2018 | |

* cited by examiner

NON-DIRECTIONAL ELECTRICAL STEEL SHEET AND METHOD FOR PRODUCING SAME

CROSS REFERENCE

This application is the U.S. National Phase under 35 U.S.C. § 371 of International Application No. PCT/KR2019/016490 filed on Nov. 27, 2019, which claims the benefit of Korean Application No. 10-2018-0152985 filed on Nov. 30, 2018, the entire contents of each are hereby incorporated by reference.

TECHNICAL FIELD

The present invention relates to a non-oriented electrical steel sheet and a method for producing the same. More particularly, to a non-oriented electrical steel sheet and a method for producing the same with improved magnetic properties after processing by adding Bi and Ga.

BACKGROUND ART

A motor or a generator is an energy conversion device that converts electrical energy into mechanical energy or mechanical energy into electrical energy, and recently, as regulations on environmental preservation and energy saving are enhanced, a need for efficiency improvement of the motor or generator is increasing. A non-oriented electrical steel sheet is an important material that is used as an iron core material in a rotary device of a motor, a generator, etc. and a stopper of a small transformer, etc., to significantly affect energy conversion efficiency. Therefore, the demand for improvement of the efficiency of the motor or generator is leading to a demand for the characteristic improvement of the non-oriented electrical steel sheet used as its iron core material.

In the motor or generator, the energy efficiency is a ratio of input energy and output energy, and for the efficiency improvement, eventually, it is important to reduce the energy loss such as iron loss, copper loss, and machine loss, etc., wherein the iron loss and the copper loss are greatly affected by the characteristics of the non-oriented electrical steel sheet. Representative magnetic properties of the non-oriented electrical steel sheet are the iron loss and a magnetic flux density, and the lower the iron loss of the non-oriented electrical steel sheet, the lower the iron loss while the iron core is magnetized, and thus, the efficiency is improved. In addition, the higher the magnetic flux density, the greater energy may be induced with the same energy, and in order to obtain the same magnetic flux density, since less current is applied, the copper loss is reduced to improve the energy efficiency. Therefore, in order to improve energy efficiency, it is necessary to develop a non-oriented electrical steel sheet technique with excellent magnetic properties of less iron loss and high magnetic flux density.

However, even if the characteristics of the non-oriented electrical steel sheet itself are excellent, the efficiency in the actual motor or generator is not necessarily excellent. In order for the non-oriented electrical steel sheet to be used as the iron core of the motor or generator, a processing process such as shearing or punching is performed, and at this time, the magnetic properties is greatly decreased by a processing stress to be applied, and there is a difference in magnetic deterioration rate depending on mechanical properties, a microstructure, or the like the steel sheet. In order to solve the magnetic deterioration by such processing, stress relief annealing is performed, but due to a problem such as costs, the stress relief annealing is not performed, but it is also used immediately after processing. Accordingly, in a non-oriented electrical steel sheet with excellent magnetic properties even after processing due to less magnetic deterioration according to processing while having excellent magnetic properties before processing, an utilization value thereof may be very high.

When describing the characteristics of the non-oriented electrical steel sheet, the most important characteristics of the non-oriented electrical steel sheet are iron loss and magnetic flux density. In an efficient method for lowering the iron loss of the non-oriented electrical steel sheet, there is a method of increasing the addition amount of Si, Al, and Mn, which are elements with large resistivity, or of decreasing the thickness of the steel sheet. However, a thin steel sheet has a disadvantage in that the productivity and processability are decreased, and thus the processing cost increases. The increase in addition amount of Si, Al, and Mn increases the resistivity of the steel to reduce eddy current loss of the iron loss of the non-oriented electrical steel sheet, thereby reducing the iron loss. However, as the addition amount increases, the iron loss is not reduced unconditionally in proportion to the addition amount, and on the contrary, since the increase in the addition amount of the alloy elements deteriorates the magnetic flux density, the appropriate addition amount and the addition ratio between the addition amounts of Si, Al, and Mn need to be appropriately controlled to ensure excellent iron loss and magnetic flux density.

In addition, even if the non-oriented electrical steel sheet with excellent magnetic properties is produced, if the magnetic deterioration rate is large due to shearing or punching when processing for being produced as an iron core material of the motor or generator, the excellent characteristics of the material are not exhibited, and thus even after processing, the non-oriented electrical steel sheet with excellent magnetic properties may be very important.

In order to lower the iron loss and improve the magnetic flux density of the non-oriented electrical steel sheet, techniques and the like have been attempted to improve magnetic properties by improving a texture using a special adding element such as REM, etc. or introduce an additional producing process such as warm-rolling, twice rolling, twice annealing, etc. However, since these techniques all cause an increase in production cost or have difficulty in mass production, it is necessary to develop a technique which is excellent in magnetic properties and is easily produced commercially. Further, in case of introducing a stress relief annealing process to solve the processing deterioration by shearing and punching, techniques for optimization for stress relief annealing conditions, and the like have been developed, but these techniques are just methods for minimizing the processing impact on processing, but techniques for fundamentally reducing the deterioration of the magnetic properties on processing have been not yet developed.

There were constant efforts to solve these problems, and many techniques have been developed. There is provided a method of reducing anisotropy by performing stress relief annealing at a high temperature to obtain uniform high-frequency iron loss in a circumferential direction. However, it is difficult to determine that the stress relief annealing improves the characteristics of the steel sheet itself, and during annealing at the high temperature, a change in texture due to crystal grain growth and a change in magnetic flux density are not considered.

In order to improve additional magnetic properties improvement during stress relief annealing, a technique for properly controlling the addition amounts of Al and B was also presented. In this case, since there is a limitation in the addition amount of Al, there is a limit to reducing the iron loss and a cost rising problem is not solved due to an additional process as long as the stress relief annealing needs to be performed.

There is provided a technique capable of having excellent iron loss by adding Ca or MG and rare earth elements such as REM to suppress the precipitation of MNS, and growing the crystal grains during stress relief annealing even if the crystal grains are small before stress relief. However, this method did not solve a problem caused by additional costs due to the stress relief annealing process.

To make low iron loss required for high strength and a stator required for a rotor compatible with a single electrical steel sheet, there is provided a method of obtaining a steel sheet with high strength before stress relief annealing and a steel sheet with low iron loss due to easiness of crystal grain growth during annealing by reducing specific impurity elements included in the steel to a very low level and adding a skin pass process. However, this method has disadvantages of causing cost rising for the lowest management of impurities, and increasing additional costs rise due to the introduction of an additional process of skin pass.

DISCLOSURE

Technical Problem

The present invention has been made in an effort to provide a non-oriented electrical steel sheet and a method for producing the same. More specifically, the present invention has been made in an effort to provide a non-oriented electrical steel sheet and a method for producing the same with improved magnetic properties after processing by adding Bi and Ga.

Technical Problem

An exemplary embodiment of the present invention provides a non-oriented electrical steel sheet comprising: 1.5 to 4.0 wt % of Si; 0.1 to 1.5 wt % of Mn, 0.7 to 1.5 wt % of Al; 0.0001 to 0.003 wt % of Bi; and 0.0001 to 0.003 wt % of Ga, with the balance comprising Fe and inevitable impurities, and satisfies Formula 1.

$$[Al]+[Mn] \geq 0.87 \qquad \text{[Formula 1]}$$

(here, [Al] and [Mn] represent the contents (weight %) of Al and Mn, respectively.)

The non-oriented electrical steel sheet may further comprise one or more of C, S, N and Ti in 0.005 wt % or less, respectively.

The non-oriented electrical steel sheet may further comprise one or more of P, Sn and Sb in 0.2 wt % or less, respectively.

The non-oriented electrical steel sheet may further comprise one or more of Cu, Ni and Cr in 0.05 wt % or less, respectively.

The non-oriented electrical steel sheet may further comprise one or more of Zr, Mo and V in 0.01 wt % or less, respectively.

The non-oriented electrical steel sheet may satisfy the following Formula 2.

$$0.0055 \geq [Bi]+[Ga] \geq 0.0008 \qquad \text{[Formula 2]}$$

(here, [Bi] and [Ga] represent the contents (wt %) of Bi and Ga, respectively.)

After the electrical steel sheet is processed, there may be a processing hardening region having the hardness of 10% or more compared to a parent material, and a depth of the processing hardening region may be 250 μm or less from a processing surface.

After the electrical steel sheet is processed, the iron loss $W_{15/50}$ of the electrical steel sheet may be 2.7 W/Kg or less and the magnetic flux density $B_1$ may be 1.02 T or more.

After the electrical steel sheet is processed, the magnetic flux density $B_{50}$ may be 1.65 T or more.

Another embodiment of the present invention provides a method for producing a non-oriented electrical steel sheet comprising the steps of: heating a slab comprising 1.5 to 4.0 wt % of Si, 0.1 to 1.5 wt % of Mn, 0.7 to 1.5 wt % of Al, 0.0001 to 0.003 wt % of Bi, and 0.0001 to 0.003 wt % of Ga, with the balance comprising Fe and inevitable impurities, and satisfying the following Formula 1; preparing a hot rolled sheet by hot-rolling the slab; preparing a cold rolled sheet by cold-rolling the hot rolled sheet; and finally annealing the cold rolled sheet.

$$[Al]+[Mn] \geq 0.87 \qquad \text{[Formula 1]}$$

(here, [Al] and [Mn] represent the contents (wt %) of Al and Mn, respectively.)

The method may further comprise processing the finally annealed steel sheet, wherein there may be a processing hardening region having the hardness of 10% or more compared to a parent material and a depth of the processing hardening region may be 250 μm or less from a processing surface.

The slab may further comprise one or more of C, S, N and Ti in 0.005 wt % or less, respectively.

According to an exemplary embodiment of the present invention, even if the non-oriented electrical steel sheet is processed, magnetic properties is not deteriorated, and even before and after processing, magnetic properties is excellent.

Therefore, after processing, stress relief annealing (SRA) for improving magnetic properties is not required.

MODE FOR INVENTION

Terms including first, second, and third are used for describing various arts, components, regions, layers, and/or sections, but are not limited thereto. The terms are only used to distinguish any part, component, region, layer, or section from the other part, component, region, layer, or section. Accordingly, the first part, component, region, layer, or section described below may be mentioned as the second part, component, region, layer, or section within the range without departing from the range of the present invention.

Special terms used herein is for the purpose of describing specific exemplary embodiments only and are not intended to be limiting of the present invention. The singular forms used herein include plural forms as well, if the phrases do not clearly have the opposite meaning. "including" used in the specification means that a specific feature, region, integer, step, operation, element and/or component is embodied and other specific features, regions, integers, steps, operations, elements, and/or components are not excluded.

When any part of or referred to as being "on", "over" the other part, which might be directly on or over the other parts or may be a different part involves therebetween. On the contrary, when any part is mentioned as being "directly on" the other parts, the other part is not interposed therebetween.

Further, unless particularly mentioned, % means weight % and 1 ppm is 0.0001 weight %.

In an embodiment of the present invention, further comprising an additional element means substitutingly comprising the balance in Fe as much as an additional amount of the additional element.

Unless defined otherwise, all terms including technical and scientific terms used herein have the same meaning as commonly understood by those skilled in the art to which the present invention belongs. Commonly used predefined terms are further interpreted as having a meaning consistent with the relevant technical literature and the present disclosure, and are not to be construed as ideal or very formal meanings unless defined otherwise.

The present invention will be described more fully hereinafter, in which exemplary embodiments of the invention are shown. As those skilled in the art would realize, the described embodiments may be modified in various different ways, all without departing from the spirit or scope of the present invention.

A non-oriented electrical steel sheet according to one embodiment of the present invention comprises: 1.5 to 4.0 wt % of Si; 0.1 to 1.5 wt % of Mn, 0.7 to 1.5 wt % of Al; 0.0001-0.003 wt % of Bi; and 0.0001 to 0.003 wt % of Ga, with the balance comprising Fe and inevitable impurities, and satisfies the following Formula 1.

$$[Al]+[Mn] \geq 0.87 \qquad \text{[Formula 1]}$$

(here, [Al] and [Mn] represent the contents (wt %) of Al and Mn, respectively.)

Hereinafter, a reason for limiting components of the non-oriented electrical steel sheet will be first described.

Si: 1.5 to 4.0 wt %

Silicon (Si) is a main element to be added to lower eddy current loss of the iron loss by increasing the resistivity of the steel. If Si is added too small, a problem of deteriorating the iron loss occurs. On the contrary, if Si is added too large, the magnetic flux density is greatly reduced, and a problem in processability may occur. Therefore, Si may be included in the above-described range. More specifically, Si may be included in 2.0 to 3.8 wt %. More specifically, Si may be included in 2.5 to 3.6 wt %.

Mn: 0.1 to 1.5 wt %

Manganese (Mn) is an element that improves the texture by increasing the resistivity with Si, Al, and the like to reduce the iron loss. If Mn is added too small, a problem of deteriorating the iron loss occurs. On the contrary, if Mn is added too large, the magnetic flux density may be greatly reduced. Therefore, Mn may be included in the above-described range. More specifically, Mn may be included in 0.12 to 1.3 wt %.

Al: 0.7 to 1.5 wt %

Aluminum (Al) is an element that plays an important role in increasing the resistivity with Si to reduce the iron loss and plays a role in reducing magnetic anisotropy to reduce magnetic deviation in a rolling direction and a rolling vertical direction. If Al is added too small, it is difficult to expect the aforementioned roles. If Al is added too large, the magnetic flux density may be greatly reduced. Therefore, Al may be included in the above-described range. More specifically, Al may be included in 0.71 to 1.4 wt %.

Mn and Al may satisfy the following Formula 1.

$$[Al]+[Mn] \geq 0.87 \qquad \text{[Formula 1]}$$

(here, [Al] and [Mn] represent the contents (wt %) of Al and Mn, respectively.)

As described above, Si, Al, and Mn are alloy elements which are added to reduce the iron loss of the non-oriented electrical steel sheet, and needs to be added in a certain amount or more for the characteristics of low iron loss. However, in the magnetic properties of the non-oriented electrical steel sheet, a low iron loss property is important, but a high magnetic flux density property is also important, and a mechanical property according to addition amounts of Si, Al, and Mn are also important. Only by an increase in addition amount of Si, the low iron loss property may be secured, but it is difficult to solve the degradation of productivity due to an increase in brittle, and as a result, it is necessary to add appropriate Mn and Al. Further, the processing hardening degree during processing is largely affected by the component, and when the brittleness of the steel is reduced by increasing the addition amounts of Mn and Al, the processing hardening degree may be reduced. Accordingly, the value of Formula 1 may be 0.87 or more. More specifically, the value of Formula 1 may be 1.0 or more. More specifically, the value of Formula 1 may be 1.0 to 2.5.

Bi: 0.0001 to 0.003 wt %

Bismuth (Bi) is a segregation element and is segregated to a grain boundary to decrease the grain boundary strength and suppress a phenomenon that the potential is fixed to the grain boundary. Through this, it is effective to suppress an increase in processing stress during shearing and punching processing, and reduce the depth of the processing stress in which the magnetic properties are deteriorated by the processing stress. However, if the addition amount thereof is too large, the grain growth is suppressed to deteriorate the magnetic properties. Therefore, Bi may be included in the above-described range. More specifically, Bi may be included in 0.0003 to 0.003 wt %. More specifically, Bi may be included in 0.0005 to 0.0028 wt %.

Ga: 0.0001 to 0.003 wt %

Gallium (Ga) is also a segregation element like Bi and is segregated to a grain boundary to decrease the grain boundary strength and suppress a phenomenon that the potential is fixed to the grain boundary. Through this, it is effective to suppress an increase in processing stress during shearing and punching processing, and reduce the depth of the processing stress in which the magnetic properties are deteriorated by the processing stress. However, if the addition amount thereof is too large, the grain growth is suppressed to deteriorate the magnetic properties. Therefore, Ga may be included in the above-described range. More specifically, Ga may be included in 0.0002 to 0.0027 wt %.

Bi and Ga may satisfy the following Formula 2.

$$0.0055 \geq [Bi]+[Ga] \geq 0.0008 \qquad \text{[Formula 2]}$$

(here, [Bi] and [Ga] represent the contents (wt %) of Bi and Ga, respectively.)

Bi and Ga have an effect of suppressing an increase in processing stress during shearing and punching processing, and reducing the depth of the processing stress in which the magnetic properties are deteriorated by the processing stress. Accordingly, Bi and Ga may be added in amounts satisfying Formula 2.

The non-oriented electrical steel sheet according to an exemplary embodiment of the present invention may further comprise one or more of C, S, N and Ti in 0.005 wt % or less, respectively. As described above, when the additional elements are further included, the additional elements are included by replacing the balance of Fe. More specifically, C, S, N and Ti may be further included in 0.005 wt % or less, respectively.

C: 0.005 wt % or Less

Carbon (C) binds to Ti, Nb, and the like to form a carbide, and deteriorates magnetic properties and increases the iron loss by magnetic aging in use after processing from a final product to an electrical product to reduce the efficiency of electrical devices, and thus, the upper limit thereof may be 0.005 wt %. More specifically, C may be further included in 0.004 wt % or less. More specifically, C may be further included in 0.001 to 0.004 wt %.

S: 0.005 wt % or Less

Sulfur (S) is an element for forming a sulfide such as MnS, CuS, and (Cu, Mn)S harmful to the magnetic properties and thus is preferably added as small as possible. If S is included in a large amount, the magnetic properties are deteriorated due to an increase in fine sulfide. Accordingly, S may be further included in 0.005 wt % or less. If S is added, it is advantageous to form the texture, and thus, if S is further included, S may be further included in 0.001 wt % or more. More specifically, S may be further included in 0.001 to 0.004 wt %.

N: 0.005 wt % or Less

Nitrogen (N) is an element which strongly binds to Al, Ti, Nb and the like to form a nitride and suppress the grain growth, and is bad to magnetic properties, and thus, is preferably included in a small amount. In an exemplary embodiment of the present invention, N may be further included in 0.005 wt % or less. More specifically, N may be further included in 0.004 wt % or less. More specifically, N may be further included in 0.001 to 0.004 wt %.

Ti: 0.005 wt % or Less

Titanium (Ti) binds to C and N to form fine carbide and nitride and suppress the grain growth, and as Ti is added in a large amount, the texture is also deteriorated due to increased carbide and nitride and the magnetic properties are deteriorated. In an exemplary embodiment of the present invention, Ti may be further included in 0.005 wt % or less. More specifically, Ti may be further included in 0.004 wt % or less. More specifically, Ti may be further included in 0.0005 to 0.004 wt %.

The non-oriented electrical steel sheet according to an exemplary embodiment of the present invention may further comprise one or more of P, Sn and Sb in 0.2 wt % or less, respectively.

Phosphorus (P), tin (Sn), and antimony (Sb) may be added for improving additional magnetic properties. However, if the addition amount is too large, there is a problem in that the grain growth is suppressed and the productivity is deteriorated, so that the addition amount thereof needs to be controlled to be added in 0.2 wt % or less, respectively.

The non-oriented electrical steel sheet according to an exemplary embodiment of the present invention may further comprise one or more of Cu, Ni and Cr in 0.05 wt % or less, respectively.

Copper (Cu), nickel (Ni), and chrome (Cr), which are elements inevitably added in a steelmaking process, react with impurity elements to form fine sulfide, carbide, and nitride and have a bad effect on the magnetic properties, so that the contents thereof are limited to 0.05 wt % or less, respectively.

The non-oriented electrical steel sheet according to an exemplary embodiment of the present invention may further comprise one or more of Zr, Mo and V in 0.01 wt % or less, respectively.

Zirconium (Zr), molybdenum (MO), and vanadium (V) are elements for forming strong carbonitrides, so that the elements are preferably not added as possible and need to be preferably added in 0.01 wt % or less, respectively.

Cu, Ni, and Cr, which are elements inevitably added in a steelmaking process, react with impurity elements to form fine sulfide, carbide, and nitride and have a bad effect on the magnetic properties, so that the contents thereof are limited to 0.05 wt % or less, respectively. Also, Zr, Mo and V are also elements for forming strong carbonitrides, so that the elements are preferably not added as possible and need to be preferably added in 0.01 wt % or less, respectively.

The balance includes Fe and inevitable impurities. The inevitable impurities are impurities that are mixed in the steelmaking process and the process of producing the oriented electrical steel sheet, which are widely known in the art, and thus, the specific description thereof will be omitted. In an exemplary embodiment of the present invention, the addition of elements other than the above-mentioned alloy components is not excluded, and the elements may be variously included within a range without departing from the technical idea of the present invention. If additional elements are further included, the elements are included by replacing the balance Fe.

Figure 1:
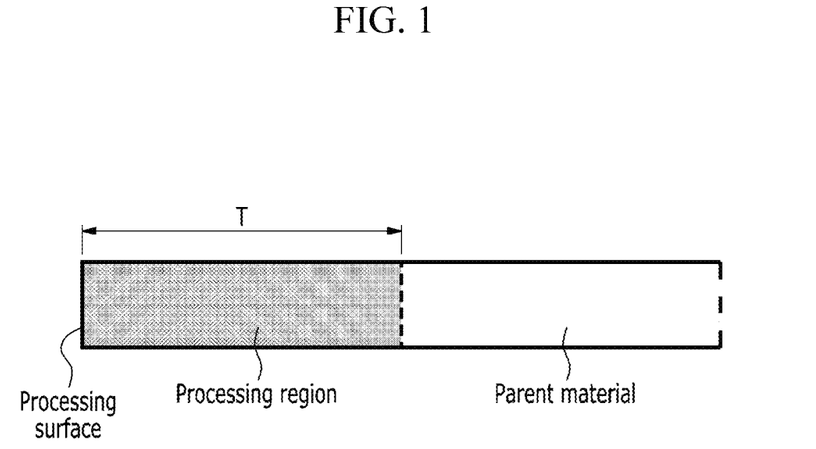
FIG. 1 is a schematic view of a cross section of a non-oriented electrical steel sheet according to an exemplary embodiment of the present invention.
Figure 2:
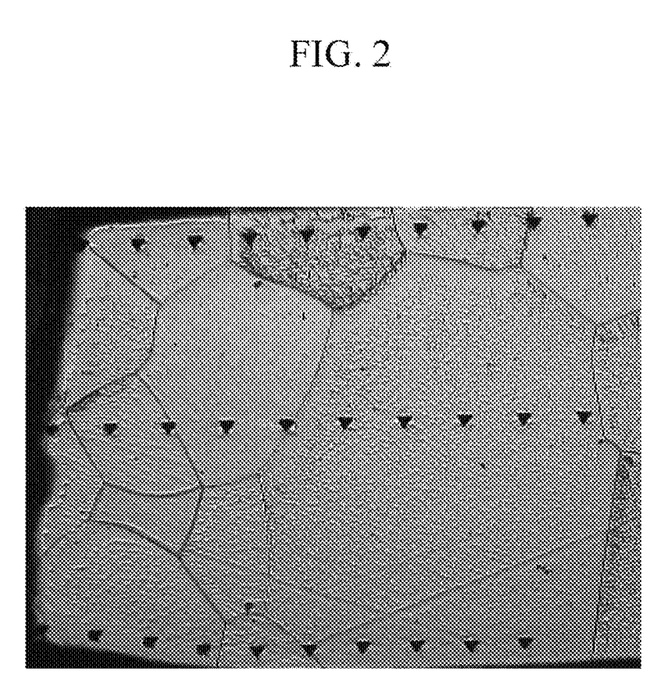
FIG. 2 is a photograph of a non-oriented electrical steel sheet in a process of analyzing a depth of a strain hardening area.

As described above, by appropriately controlling the addition amounts of Si, Mn, Al, Bi, and Ga, the deterioration of magnetic properties during processing may be minimized. Specifically, in an exemplary embodiment of the present invention, after the electrical steel sheet is processed, there is a processing hardening region having a hardness of 10% or more compared to a parent material, and the depth of the processing hardening region may be 250 μm or less from a processing surface. At this time, the processing may be partially cutting the steel sheet such shearing, punching, and the like. In FIG. 1, a processing surface, a processing hardening region, and a depth T of the processing hardening region will be described. In an exemplary embodiment of the present invention, since the depth T of the processing hardening region is short, the deterioration of magnetic properties due to processing may be minimized. Mores specifically, the depth of the processing hardening region may be 100 to 250 μm from the processing surface.

After processing the electrical steel sheet, iron loss $W_{15/50}$ of the electrical steel sheet may be 2.7 W/kg or less and a magnetic flux density $B_1$ may be 1.02 T or more. The iron loss $W_{15/50}$ is iron loss when the magnetic flux density of 1.5 T is left at a frequency of 50 Hz. The magnetic flux density $B_1$ is a magnetic flux density induced in a magnetic field of 100 A/m. More specifically, after the electrical steel sheet is processed, the iron loss $W_{15/50}$ of the electrical steel sheet may be 2.6 W/Kg or less and the magnetic flux density $B_1$ may be 1.05 T or more. More specifically, after the electrical steel sheet is processed, the iron loss $W_{15/50}$ of the electrical steel sheet may be 2.0 to 2.55 W/Kg and the magnetic flux density $B_1$ may be 1.05 to 1.2 T.

After the electrical steel sheet is processed, a magnetic flux density $B_{50}$ of the electrical steel sheet may be 1.65 T or more. The magnetic flux density $B_{50}$ is a magnetic flux density induced in a magnetic field of 5000 A/m. More specifically, the magnetic flux density $B_{50}$ of the electrical steel sheet may be 1.66 T or more. More specifically, the magnetic flux density $B_{50}$ of the electrical steel sheet may be 1.66 to 1.7 T.

A method for producing a non-oriented electrical steel sheet according to an exemplary embodiment of the present invention includes heating a slab; preparing a hot rolled sheet by hot-rolling the slab; preparing a cold rolled sheet by cold-rolling the hot rolled sheet; and finally annealing the cold rolled sheet.

Alloy components of the slab have been described in the alloy components of the non-oriented electrical steel sheet described above, and thus the duplicated description will be omitted. In the process of producing the non-oriented electrical steel sheet, since the alloy components are not substantially changed, the alloy components of the non-oriented electrical steel sheet and the slab are substantially the same as each other.

Specifically, the slab comprises: 1.5 to 4.0 wt % of Si; 0.1 to 1.5 wt % of Mn, 0.7 to 1.5 wt % of Al; 0.0001 to 0.003 wt % of Bi; and 0.0001 to 0.003 wt % of Ga, with the balance comprising Fe and inevitable impurities, and may satisfy the following Formula 1.

$$[Al]+[Mn]\geq 0.87 \qquad [\text{Formula 1}]$$

(here, [Al] and [Mn] represent the contents (wt %) of Al and Mn, respectively.)

Other additional elements have been described in the alloy components of the non-oriented electrical steel sheet, and thus, the duplicated description will be omitted.

First, the slab is heated. The heating temperature of the slab is not limited, but the slab may be heated to 1200° C. or less. If the slab heating temperature is too high, a precipitate such as AlN, MnS, and the like present in the slab is resolublized and then finely precipitated during hot rolling and annealing to suppress the grain growth and deteriorate the magnetic properties.

Next, the slab is hot-rolled to prepare the hot rolled sheet. The thickness of the hot rolled sheet may be 2 to 2.3 mm. In the process of preparing the hot rolled sheet, the finish rolling temperature may be 800 to 1000° C. The hot rolled sheet may be wound at a temperature of 700° C. or less.

After the preparing of the hot rolled sheet, the method may further include annealing the hot rolled sheet. At this time, the annealing temperature of the hot rolled sheet may be 950 to 1150° C. When the annealing temperature of the hot rolled sheet is too low, the tissue is not grown or finely grown, so that it is not easy to obtain a texture favorable for the magnetic properties during annealing after cold rolling. When the annealing temperature is too high, the self-grain is excessively grown and the surface defects of the sheet are excessive. The annealing of the hot rolled sheet is performed to increase an orientation favorable for the magnetic properties if necessary and can be omitted. The annealed hot rolled sheet may be pickled.

Next, the hot rolled sheet is cold-rolled to prepare the cold rolled sheet. The cold rolling is finally performed at a thickness of 0.10 mm to 0.70 mm. If necessary, first cold rolling and second cold rolling after intermediate annealing may be performed, and a final thickness reduction ratio may be in the range of 50 to 95%.

Next, the cold rolled sheet is finally annealed. In the process of annealing the cold rolled sheet, the annealing temperature is not greatly limited so long as the temperature is a temperature to be generally applied to the non-oriented electrical steel sheet. Since the iron loss of the non-oriented electrical steel sheet is closely associated with a grain size, the annealing temperature is suitable for 900 to 1100° C. When the temperature is too low, the grains are too fine to increase the history loss, and when the temperature is too high, the grains are too coarse, so that the eddy current loss is increased and the iron loss may be deteriorated.

After final annealing, an average grain diameter of the steel sheet may be 70 to 150 μm.

After final annealing, an insulating film may be formed. The insulating film may be treated with organic, inorganic, and organic/inorganic composite films, and may be treated with other coating agents capable of insulation.

Next, the electrical steel sheet may be processed. At this time, the processing means cutting the steel sheet by shearing, punching, or the like to manufacture a motor, a generator, and the like.

As described above, in an exemplary embodiment of the present invention, since the deterioration of the magnetic properties by processing is small, a motor, generator, or the like may be manufactured without separate stress relief annealing. Specifically, after the processing of the finally annealed steel sheet, there is a processing hardening region having the hardness of 10% or more compared to the parent material and the depth of the processing hardening region may be 250 μm or less from the processing surface. The depth of the processing hardening region and the magnetic properties after processing have been described in detail in the non-oriented electrical steel sheet, and thus the duplication description will be omitted.

Hereinafter, the present invention will be described in more detail through Examples. However, these Examples are only for illustrative of the present invention, and the present invention is not limited thereto.

EXAMPLE

Slabs comprising alloy components shown in Table 1 below and the balance comprising Fe and inevitable impurities were prepared. The slabs were heated at 1180° C. and hot-rolled at a thickness of 2.5 mm and then wound. A hot rolled steel sheet wound and cooled in the air was annealed at 1010° C. and pickled, and cold-rolled at a thickness of 0.50 mm, and then finally cold rolled sheet was annealed. At this time, an annealing target temperature of the cold rolled sheet was performed at 1000° C.

Each specimen was processed as an Epstein sample capable of measuring magnetic properties through shearing processing, the hardness was measured at an interval of 50 μm with a load of 25 gf in a depth direction from a processing surface, and the iron loss $W_{15/50}$ and magnetic flux densities $B_1$ and $B_{50}$ were measured, and the results thereof were illustrated in Table 2 below.

The depth of the processing hardening region is a depth at which the hardness of 10% or more to the average hardness of the parent material is increased when the hardness was measured in the depth direction from the processing surface subjected to shearing.

The iron loss $W_{15/50}$ is average loss (W/kg) of a rolling direction and a vertical direction to the rolling direction when the magnetic flux density of 1.5 Tesla at a frequency of 50 Hz was left.

The magnetic flux density $B_1$ is a size (Tesla) of the magnetic flux density induced when a magnetic field of 100 Nm was applied.

The magnetic flux density $B_{50}$ is a size (Tesla) of the magnetic flux density induced when a magnetic field of 5000 A/m was applied.

TABLE 1

| Steel type (wt %) | C | Si | Mn | P | S | Al | N | Ti | Bi | Ga |
|---|---|---|---|---|---|---|---|---|---|---|
| A1 | 0.0023 | 2.67 | 0.25 | 0.009 | 0.0019 | 0.84 | 0.0038 | 0.0029 | 0 | 0 |
| A2 | 0.0015 | 2.72 | 0.3 | 0.012 | 0.0015 | 0.78 | 0.0015 | 0.0015 | 0.0005 | 0 |
| A3 | 0.0029 | 2.67 | 0.25 | 0.009 | 0.0008 | 0.77 | 0.0023 | 0.0018 | 0 | 0.0004 |
| A4 | 0.0018 | 2.67 | 0.26 | 0.01 | 0.0037 | 0.84 | 0.003 | 0.0013 | 0.0003 | 0.0005 |
| A5 | 0.0031 | 2.7 | 0.35 | 0.01 | 0.001 | 0.82 | 0.0021 | 0.0007 | 0.0005 | 0.0009 |
| A6 | 0.0018 | 2.66 | 0.31 | 0.012 | 0.0018 | 0.76 | 0.0018 | 0.0018 | 0.0014 | 0.0015 |
| A7 | 0.0026 | 2.75 | 0.33 | 0.009 | 0.003 | 0.77 | 0.0028 | 0.0017 | 0.0024 | 0.0023 |
| A8 | 0.0014 | 2.73 | 0.25 | 0.01 | 0.0027 | 0.85 | 0.003 | 0.003 | 0.0028 | 0.0027 |
| A9 | 0.0025 | 2.69 | 0.29 | 0.012 | 0.0023 | 0.81 | 0.0029 | 0.0016 | 0.003 | 0.0038 |
| A10 | 0.0016 | 2.71 | 0.34 | 0.01 | 0.0015 | 0.77 | 0.0019 | 0.0041 | 0.0035 | 0.0045 |
| A11 | 0.0013 | 2.66 | 0.3 | 0.01 | 0.0024 | 0.82 | 0.001 | 0.0008 | 0.0049 | 0.0057 |

TABLE 2

| Steel type | Mn + Al | Bi + Ga | Processing hardening depth (μm) | Iron loss, $W_{15/50}$ (W/Kg) | Magnetic flux density, $B_1$ (T) | Magnetic flux density, $B_{50}$ (T) | Note |
|---|---|---|---|---|---|---|---|
| A1 | 1.09 | 0 | 400 | 3.12 | 0.96 | 1.66 | Comparative Example |
| A2 | 1.08 | 0.0005 | 350 | 2.99 | 0.99 | 1.67 | Comparative Example |
| A3 | 1.02 | 0.0004 | 350 | 2.94 | 1.01 | 1.67 | Comparative Example |
| A4 | 1.1 | 0.0008 | 250 | 2.46 | 1.07 | 1.67 | Inventive Example |
| A5 | 1.17 | 0.0014 | 250 | 2.42 | 1.1 | 1.68 | Inventive Example |
| A6 | 1.07 | 0.0029 | 200 | 2.37 | 1.09 | 1.67 | Inventive Example |
| A7 | 1.1 | 0.0047 | 200 | 2.31 | 1.15 | 1.67 | Inventive Example |
| A8 | 1.1 | 0.0055 | 150 | 2.25 | 1.18 | 1.68 | Inventive Example |
| A9 | 1.1 | 0.0068 | 150 | 2.85 | 1.12 | 1.67 | Comparative Example |
| A10 | 1.11 | 0.008 | 150 | 2.97 | 1.14 | 1.67 | Comparative Example |
| A11 | 1.12 | 0.0106 | 150 | 3.08 | 1.11 | 1.67 | Comparative Example |

As shown in Tables 1 and 2, A4, A5, A6, A7, and A8, which satisfied both the addition amount range of each component of Si, Al, Mn, Bi, and Ga and Formula 1, had a processing hardening depth of 250 μm, and were very excellent in the iron loss $W_{15/50}$ and the magnetic flux densities $B_1$ and $B_{50}$.

On the other hand, A1 satisfied Formula 1, but both Bi and Ga were not added, and as a result, the processing hardening depth was more than 250 μm, and the iron loss $W_{15/50}$ and the magnetic flux density $B_1$ were lowered. It was determined that the magnetic flux density $B_{50}$ was influenced by the processing hardening depth, but was not large, and the reason is that in a high magnetic field, the magnetic force was large, so that the processing stress was not largely affected.

A2 satisfied Formula 1 and the addition range of Bi, but the addition range of Ga was not satisfied and the processing hardening depth was more than 250 μm, and as a result, the iron loss $W_{15/50}$ and the magnetic flux density $B_1$ were lowered.

A3 satisfied Formula 1 and the addition range of Ga, but the addition range of Bi was not satisfied and the processing hardening depth was more than 250 μm, and as a result, the iron loss $W_{15/50}$ and the magnetic flux density $B_1$ were lowered.

A9 also satisfied Formula 1 and the addition range of Bi, but the addition range of Ga was not satisfied. However, in A9, the addition range of Bi was satisfied and the addition range of Ga was further added, and as a result, the processing hardening depth was good as 250 μm or less, the magnetic flux densities $B_1$ and $B_{50}$ were good, and the iron loss $W_{15/50}$ was lowered. As a result, when the addition ranges of Bi and Ga were exceeded, the iron loss was lowered due to an effect of suppressing the grain growth.

A10 and A11 satisfied Formula 1, but Bi and Ga exceeded the addition range, and the iron loss $W_{15/50}$ was lowered. In A10 and A11, Bi and Ga were added beyond the addition range, and as a result, an effect of reducing the processing hardening depth was implemented, the processing hardening depth was good as 250 μm or less, but the iron loss $W_{15/50}$ was lowered due to the effect of suppressing the grain growth caused by more than the addition range.

Example 2

Slabs comprising alloy components shown in Table 3 below and the balance comprising Fe and inevitable impurities were prepared. The slabs were heated at 1160° C. and hot-rolled at a thickness of 2.3 mm and then wound. A hot rolled steel sheet wound and cooled in the air was annealed at 1030° C. and pickled, and cold-rolled at a thickness of 0.50 mm, and then finally cold rolled sheet was annealed. At this time, an annealing target temperature of the cold rolled sheet was performed at 1020° C.

Each specimen was processed as an Epstein sample capable of measuring magnetic properties through shearing processing, the hardness was measured at an interval of 50 μm with a load of 25 gf in a depth direction from a processing surface, and the iron loss $W_{15/50}$ and magnetic flux densities $B_1$ and $B_{50}$ were measured, and the results thereof were illustrated in Table 4 below.

The processing hardening depth, the iron loss $W_{15/50}$, and the magnetic flux densities $B_1$ and $B_{50}$ were measured in the same as in Example 1.

On the other hand, B1 satisfied the addition range of each of Al, Mn, Bi and Ga, but did not satisfy Formula 1, and as a result, the processing hardening depth was not satisfied as 250 μm or less, and the iron loss $W_{15/50}$ and the magnetic flux density $B_1$ were lowered.

B4 satisfied the addition ranges of each of Al and Mn and Formula 1, but did not satisfy the addition ranges of Bi and Ga and the processing hardening depth was not satisfied as 250 μm or less, and as a result, the iron loss $W_{15/50}$ and the magnetic flux density $B_1$ were lowered.

B7 did not satisfy the addition ranges of Al and Ga and Formula 1, and the processing hardening depth was not satisfied as 250 μm or less, and as a result, the iron loss $W_{15/50}$ and the magnetic flux density $B_1$ were lowered.

TABLE 3

| Steel type (wt %) | C | Si | Mn | P | S | Al | N | Ti | Sn | Bi | Ga |
| --- | --- | --- | --- | --- | --- | --- | --- | --- | --- | --- | --- |
| B1 | 0.0023 | 2.62 | 0.12 | 0.019 | 0.0016 | 0.73 | 0.0035 | 0.0024 | 0.04 | 0.0027 | 0.001 |
| B2 | 0.0038 | 3.5 | 0.22 | 0.038 | 0.002 | 1.33 | 0.0032 | 0.0005 | 0.02 | 0.0004 | 0.001 |
| B3 | 0.0012 | 2.81 | 0.71 | 0.01 | 0.0032 | 0.94 | 0.0015 | 0.0013 | 0.06 | 0.0025 | 0.0008 |
| B4 | 0.003 | 2.93 | 0.16 | 0.04 | 0.0019 | 0.66 | 0.0025 | 0.0027 | 0.01 | 0 | 0 |
| B5 | 0.0028 | 2.95 | 0.48 | 0.009 | 0.0017 | 0.83 | 0.0021 | 0.0035 | 0.02 | 0.0026 | 0.0008 |
| B6 | 0.0038 | 2.63 | 1.11 | 0.03 | 0.0018 | 1.12 | 0.0013 | 0.0008 | 0 | 0.002 | 0.0004 |
| B7 | 0.0017 | 3.03 | 0.17 | 0.012 | 0.0037 | 0.65 | 0.0025 | 0.001 | 0 | 0.0011 | 0 |
| B8 | 0.0033 | 3.24 | 0.26 | 0.007 | 0.0027 | 0.58 | 0.0023 | 0.0017 | 0.03 | 0 | 0.0038 |
| B9 | 0.0033 | 2.6 | 1.29 | 0.04 | 0.0024 | 1.03 | 0.0024 | 0.003 | 0.01 | 0.0005 | 0.0004 |
| B10 | 0.0029 | 3.17 | 0.16 | 0.01 | 0.0033 | 0.71 | 0.0026 | 0.0007 | 0.02 | 0.0027 | 0.0002 |
| B11 | 0.0007 | 3.26 | 0.94 | 0.011 | 0.0026 | 0.74 | 0.0005 | 0.0014 | 0.03 | 0.0057 | 0.0048 |
| B12 | 0.0016 | 3.38 | 0.49 | 0.043 | 0.0022 | 0.72 | 0.0029 | 0.0027 | 0 | 0.0005 | 0.0021 |
| B13 | 0.0024 | 3.52 | 0.09 | 0.005 | 0.0012 | 0.7 | 0.0006 | 0.0012 | 0.01 | 0.0042 | 0.0059 |

TABLE 4

| Steel type | Mn + Al | Bi + Ga | Processing hardening depth (μm) | Iron loss, $W_{15/50}$ (W/Kg) | Magnetic flux density, $B_1$ (T) | Magnetic flux density, $B_{50}$ (T) | Note |
| --- | --- | --- | --- | --- | --- | --- | --- |
| B1 | 0.85 | 0.0037 | 300 | 2.98 | 0.99 | 1.68 | Comparative Example |
| B2 | 1.55 | 0.0014 | 150 | 2.24 | 1.05 | 1.66 | Inventive Example |
| B3 | 1.65 | 0.0033 | 250 | 2.36 | 1.14 | 1.69 | Inventive Example |
| B4 | 0.82 | 0 | 350 | 2.93 | 0.97 | 1.67 | Comparative Example |
| B5 | 1.31 | 0.0034 | 200 | 2.33 | 1.09 | 1.68 | Inventive Example |
| B6 | 2.22 | 0.0024 | 200 | 2.49 | 1.17 | 1.69 | Inventive Example |
| B7 | 0.86 | 0.0011 | 300 | 2.86 | 0.95 | 1.66 | Comparative Example |
| B8 | 0.84 | 0.0038 | 300 | 2.83 | 0.97 | 1.64 | Comparative Example |
| B9 | 2.33 | 0.0009 | 150 | 2.52 | 1.15 | 1.7 | Inventive Example |
| B10 | 0.87 | 0.0029 | 150 | 2.29 | 1.08 | 1.67 | Inventive Example |
| B11 | 1.68 | 0.0105 | 150 | 2.81 | 1.04 | 1.65 | Comparative Example |
| B12 | 1.21 | 0.0026 | 200 | 2.26 | 1.06 | 1.66 | Inventive Example |
| B13 | 0.79 | 0.0101 | 300 | 2.75 | 1.01 | 1.64 | Comparative Example |

As shown in Tables 1 and 2, B2, B3, B5, B6, B9, B10, and B12, which satisfied both the addition amount range of each component of Si, Al, Mn, Bi, and Ga and Formula 1, had a processing hardening depth of 250 μm, and were very excellent in the iron loss $W_{15/50}$ and the magnetic flux densities $B_1$ and $B_{50}$.

B8 did not satisfy the addition ranges of Al, Bi and Ga and Formula 1, and as a result, the processing hardening depth was not satisfied as 250 μm or less, and the iron loss $W_{15/50}$ and the magnetic flux densities $B_1$ and $B_{50}$ were lowered.

B11 satisfied the addition ranges of Al and Mn and Formula 1, but Bi and Ga were added beyond the addition ranges, and as a result, the processing hardening depth was good as 250 μm or less, but the iron loss $W_{15/50}$ was lowered. Bi and Ga were added beyond the addition ranges, and as a result, an effect of reducing the processing hardening depth was implemented, the processing hardening depth was good as 250 μm or less, but the iron loss was lowered due to the effect of suppressing the grain growth caused by more than the addition range.

B13 did not satisfied the addition ranges of Mn, Bi, and Ga and Formula 1, and the processing hardening depth was also not satisfied as 250 μm or less, and as a result, the iron loss $W_{15/50}$ and the magnetic flux densities $B_1$ and $B_{50}$ were lowered.

The present invention is not limited to the exemplary embodiments and can be manufactured in various different forms, and it will be appreciated that those skilled in the art to which the present invention pertains can be executed in other detailed forms without changing the technical spirit or requisite features of the present invention. Therefore, it should be appreciated that the aforementioned embodiments are illustrative in all aspects and are not restricted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A non-oriented electrical steel sheet comprising: 1.5 to 4.0 wt % of Si; 0.1 to 1.5 wt % of Mn; 0.7 to 1.5 wt % of Al; 0.0001 to 0.003 wt % of Bi; and 0.001 to 0.0025 wt % of Ga, with the balance comprising Fe and inevitable impurities, and satisfying the following Formulas 1 and 2:

$$0.87 \leq [Al]+[Mn] \leq 3.0, \quad \text{[Formula 1]}$$

wherein [Al] and [Mn] represent the contents wt % of Al and Mn, respectively, $$0.0008 \leq [Bi]+[Ga] \leq 0.0055, \quad \text{[Formula 2]}$$

wherein [Bi] and [Ga] represent the contents wt % of Bi and Ga, respectively.

2. The non-oriented electrical steel sheet of claim 1, further comprising:
one or more of C, S, N or Ti in 0.005 wt % or less, respectively.

3. The non-oriented electrical steel sheet of claim 1, further comprising:
one or more of P, Sn or Sb in 0.2 wt % or less, respectively.

4. The non-oriented electrical steel sheet of claim 1, further comprising:
one or more of Cu, Ni or Cr in 0.05 wt % or less, respectively.

5. The non-oriented electrical steel sheet of claim 1, further comprising:
one or more of Zr, Mo or V in 0.01 wt % or less, respectively.

6. The non-oriented electrical steel sheet of claim 1, wherein:
after processing the electrical steel sheet, there is a processing hardening region having the hardness of 10% or more compared to a parent material, and a depth of the processing hardening region is 250 μm or less from a processing surface.

7. The non-oriented electrical steel sheet of claim 1, wherein:
after processing the electrical steel sheet, the iron loss $W_{15/50}$ of the electrical steel sheet is 2.7 W/Kg or less and the magnetic flux density $B_1$ is 1.02 T or more.

8. The non-oriented electrical steel sheet of claim 1, wherein:
after the electrical steel sheet is processed, the magnetic flux density $B_{50}$ is 1.65 T or more.

* * * * *